US006468345B1

(12) United States Patent
Zhu et al.

(10) Patent No.: US 6,468,345 B1
(45) Date of Patent: Oct. 22, 2002

(54) PROCESS FOR PRODUCING BOTH STEAM POWER AND CEMENT CLINKER SIMULTANEOUSLY IN ONE APPARATUS ITS PRODUCTS, APPARATUS AND USE

(75) Inventors: Xuefang Zhu; Ben'en Liu, both of Beijing (CN)

(73) Assignee: The Chinese Academy of Sciences, Beijing (CN)

( * ) Notice: Subject to any disclaimer, the term of this patent is extended or adjusted under 35 U.S.C. 154(b) by 0 days.

(21) Appl. No.: 08/696,676

(22) Filed: Aug. 14, 1996

(30) Foreign Application Priority Data

Aug. 14, 1995 (CN) .......................................... 95115360

(51) Int. Cl.$^7$ ................................................ C04B 7/06
(52) U.S. Cl. ........................ 106/705; 106/709; 106/739; 106/745; 106/758; 106/763; 106/767; 106/DIG. 1; 60/645; 60/648
(58) Field of Search ................................ 106/705, 709, 106/739, 745, 758, 763, 767, DIG. 1; 110/347, 342; 432/14; 60/645, 648

(56) References Cited

U.S. PATENT DOCUMENTS

| 2,745,657 A | * | 5/1956 | Oster ........................ 106/758 |
| 4,256,504 A | * | 3/1981 | Dunstan, Jr. ........... 106/DIG. 1 |
| 4,387,654 A | * | 6/1983 | Binasik et al. .............. 110/347 |
| 4,396,432 A | * | 8/1983 | Rostoker ..................... 106/763 |
| 4,474,010 A | * | 10/1984 | Shibuya et al. ............... 60/648 |
| 4,508,573 A | * | 4/1985 | Harris ........................ 106/752 |
| 4,555,392 A | * | 11/1985 | Steinberg ..................... 423/244 |
| 4,600,438 A | * | 7/1986 | Harris ........................ 106/757 |

FOREIGN PATENT DOCUMENTS

| CN | 85102767 | 9/1986 | |
| CN | 1047846 | 12/1990 | |
| CN | 1051717 | 5/1991 | |
| CN | 1052297 | 6/1991 | |
| CN | 1052469 | 6/1991 | |
| CN | 1076182 | 9/1993 | |
| CN | 1079772 | 12/1993 | |
| CN | 1023557 | 1/1994 | |
| DE | 2753390 | * 1/1979 | .................. 106/758 |
| GB | 1556788 | * 11/1979 | |

* cited by examiner

Primary Examiner—Paul Marcantoni
(74) Attorney, Agent, or Firm—Reed Smith LLP

(57) ABSTRACT

The present invention discloses a process for producing both steam power and the fast-burnt cement clinker/fast burnt modified coal ash simultaneously in one apparatus, the fast-burnt cement clinker/fast-burnt modified coal ash prepared by said process as well as cement products prepared using them as active substance. It also discloses the apparatus suitable for embodying this process. Said process of the present invention possesses the technoligical features of fast-burning and fast-cooling and contributes a good hydraulic cementitious activity to the said fast-burnt cement clinker/fast-burnt modified coal ash which are capable of being directly used as active substance in cement production of high quality.

51 Claims, 7 Drawing Sheets

The flowchart of the dry processing rotary kiln with precalcination

The flowchart of the dry processing rotary kiln with precalcination

Flowchart of existing coal-powder-burning boiler system

The flowchart of the apparatus for simultaneously producing both steam powder and the first-burnt cement clinker as well as optionally preparing first-burnt cement The flowchart of the apparatus for simultaneously producing both steam powder and the first-burnt modified coal ash as well as optionally preparing first-burnt modified coal ash cement Fig. 8  Physical phase analysis by polarizing microscope photo on 12# Test Sample from Example 2
Fig. 9  Physical phase analysis by polarizing microscope photo on Fast-burnt clinke obtained from Example 6

Fig. 10    Physical phase analysis by polarizing microscope photography on the fast-burnt modified coal ash obtained in Example 14
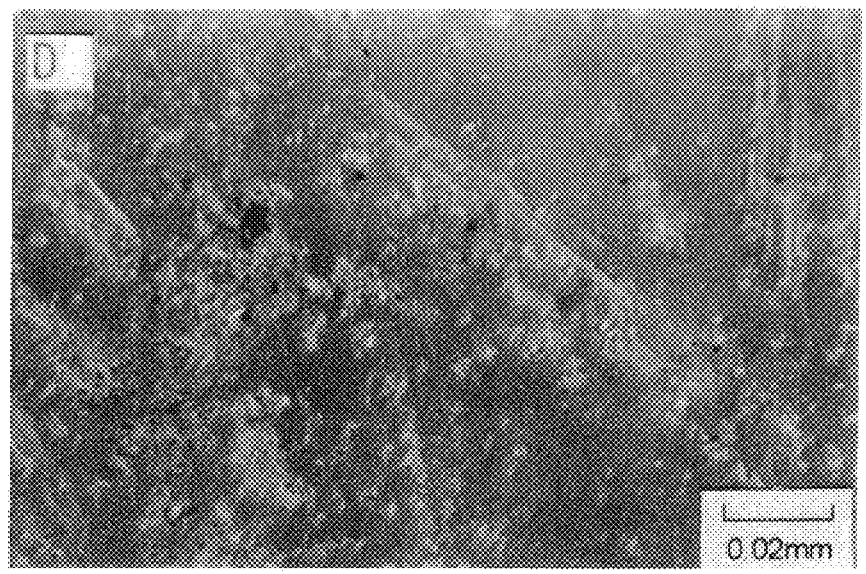

PROCESS FOR PRODUCING BOTH STEAM POWER AND CEMENT CLINKER SIMULTANEOUSLY IN ONE APPARATUS ITS PRODUCTS, APPARATUS AND USE

BACKGROUND OF THE INVENTION

The present invention relates to a process for producing both steam power and cement clinker simultaneously in one apparatus, to the apparatus composed mainly of a coal-powder-burning boiler system which is especially designed to embody said process, to the cement clinker obtainable by said process and also to the use of this cement clinker, the present invention further relates to a process for producing both steam power and a fast-burnt modified coal ash simultaneously while the coal powder is burning in the furnace, to the fast-burnt modified coal ash obtainable by this process, to the apparatus composed mainly of a existing coal-powder-burning boiler system for carrying out this process, to the use of this modified coal ash as cement clinker, and to the use of the existing coal-powder-burning boiler system in production of the fast-burnt modified coal ash, the present invention still further relates to a process for desulfurization from the flue gas of the coal-powder-burning boiler.

Cement is one of the three fundamental materials of the construction industry, it is widely used in a great amount. The most commonly used is portland series cement, GB 175-92 is referred to as its chinese national standard.

The principal raw material for the production of cement clinker is lime stone, clay and iron powder, the fuel used is mainly coal. The active component of the cement clinker is mineral composition comprised mainly of calcium silicates which can be formed usually at 1450° C., or at 1300° C. while mineralizing agent is added thereinto. The main segments for cement production can, whatever a process and a kiln is used, be summarized as "two pulverizing and one burning", namely, the three basic procedures: raw material blending and pulverizing; clinker burning; and cement pulverizing. FIG. 1 is a layout of the rotary kiln technological flow chart for an advanced out-of-kiln predecomposition dry process wherein the most critical apparatus is the clinker burning rotary kiln. In the clinker burning procedure, fuel and raw material are respectively fed into the kiln; the coal powder is injected into the burning kiln through a burner at the kiln end of clinker discharge, a flame like a head of Chinese writing brush is formed at the position of the central line with its high temperature flame up to 1600° C.–1700° C., heat is transferred by means of convection and radiation to the materials advancing in stacks as the kiln rotates and having a filling rate of about 12–14% in the rotary kiln. There exist two main problems for such heat transfer: one is its low heat efficiency, generally only about 22%, even the advanced out-of-kiln predecomposition rotary kiln dry process has its heat efficiency but up to about 50%; the other is its inhomogeneous heat transfer because the materials is in stacks, causing a longer period of time for the procedures from entry of raw material in the kiln to formation of clinker as well as its cooling (generally it needs about 1.5–2 hour, the out-of-kiln decomposition kiln also needs 40 minutes to 1 hour). The characters of this technology can be summarized as "slow burning and slow cooling"; additionally, the clinker is also likely to be over-burnt. The existance of very high burning temperature, inhomogeneous burning and over burning cause a negative influence on cementitious mineral activity and finally influences the performances of the cement clinker. In addition to the above-indicated defects such as high energy consumption, inhomogeneous heat transfer affecting negatively its product quality because the heat transfer is not well, the cement production further brings forth other problems such as consuming huge amount of mine resources, occupying much land, spending large amount of materials transportation coast and resulting in environmental pollution as of land, water source, atmosphere etc.

Coal-powder-burning boiler system is an apparatus widely used for producing steam power, high temperature and high pressure steam produced can be used, for example, for electrical power generation or other purpose. Its principal apparatus flowchart is shown in FIG. 2. It can be seen from FIG. 2 that the coal powder burning boiler system is mainly composed of the following subsystems: Raw coal blending system (including 1,2,3), coal pulverization system (including 4,5,6), coal powder convey and combustion and heat supply system (including 7,8,9,10), and by-product treatment system (including 11,12,13). Among them, the main device is the coal-powder-burning boiler (9). The coal powder, after being injected by a burner into the furnace chamber, is in a form of highly disperse and fludized suspension; while contacting with and being heated by the gas flow of high temperature in range of 1300–1600° C. in the furnace combustion zone, the said coal powder burns and release heat; the high temperature and high pressure steam produced in the boiler can be directly used for driving turbine and/or other power or thermal engineering apparatus. The residence time of coal powder or its ash substances in the high temperature zone of furnace chamber averages generally about 2–6 seconds with the possibly highest reaching 8 seconds. The coal ash formed exits the furnace chamber along with the flue gas flow at the temperature of about 1200° C. and enters the dust-containing flue gas duct, and carries out indirect heat exchange with the steam, feed water and blowing-in air of the boiler, during this procedure, the formed coal ash cools down quickly and homogeneously, and then enters in the electrical dust-remover (11) and is collected therein. Meanwhile, a small amount of slag fall down to the bottom of furnace and is quenched by water and then collected and discharged. The characters of this process, i.e. the fast burning and heat releasing in the furnace, and the fast formation and cooling down of the coal ash and slag can be summarized as "fast-burning and fast cooling; the collected coal ash is usually delivered hydraulically into the specially-built ash pits (13) and/or pneumatically into the tanks for storage; after coal ash is removed, the exhaust gas containing a minor amount of coal ash dust and some $SO_2$ is emitted into the atmosphere.

Such a coal-powder-burning boiler has large heat-transfer area and large heatransfer coefficient, so its thermal efficiency can reach 90% or even ligher. However, the operation of such coal-powder-burning boiler brings forth two rather serious problems: one is: a large amount of by-produced coal ash gives rise to rather serious pollution, e.g., a 850 mw thermal power plant will spend each year 20 millions RMB or more and occupies much land for building or extending works of ash piling pits, will consume much water and power for transporting coal ash, and will pollute the environment because the coal ash flies with the wind or leaking along with rain water from the ash piling pits; the other is that the exhaust gas emitted from the chimneys carries rather large amount of $SO_2$ and the residue of fly ash into air which also cause atmospheric pollution.

Since a long term, many approaches have been researched and developed in order to treat and utilize comprehensively the waste ash and slag collected from the coal powderburning boiler. Among them, the main one is to use it as an admixture i.e., the filler to produce coal ash cement, but the addition of coal ash is generally limited to 20–40% (refer to GB 1344-92), so both the rate and the value thereof are not high; further, the coal ash transporting from the steam powder plant to the cement works needs again large amount of transport fee. One of the main reasons which causes the addition of coal ash being incapable of going beyond 40% is that the coal ash turns out to be a kind of pozzolan, featuring a chemical composition of Si-riched and Ca-lack, it has some potential hydrauric cementitious activity. In order to develop such a potential activity, many measures have been taken, but these measures mostly have been directing to the ready coal ash which had come out of the furnace before treatment, the main problem thereof is that its potential activity is very much limited, correspondingly its activity capable of being developed is also very much limited and is by no means to be comparable to the good hydraulic cementitious activity of the cement clinker, therefore, this problem is not substantially solved.

For example, the "Test and Research on coal ash hydraulic activity-improving techniques" (<<China Building materials>>, May, 1995) discloses a process for activating coal ash, wherein activating agent is added into cool ash after its formation and then conducted calcination at 650–800° C. for the modification. Such a process is still limited to Activating the potential activity of the coal ash, and the coal ash activated thereby is still incapable of being used as the main cementitious substance to produce coal ash cement, thus it fails to raise its utility rate and value.

Recently, a process for modifying coal ash by adding lime stone powder into coal powder and then burning in the coal-powder-burning boiler has been developed ("Development of high calcium content coal ash and its use for cement production Sand saving clinker", <<Chinese Building Material Sciences. And Technology>>, No.5, 1993). However, as the decomposition of lime stone into CaO and $CO_2$ is a endothermic reaction, it absorbs a large amount of heat in the boiler furnace chamber, influencing the normal combustion and steam power production of the boiler, or even worse, resulting in a fire-extinction accident of the furnace chamber. So the addition amount of lime stone can only be very limited and the maximal Ca content in the so-called" high calcium content (expressed is CaO % by weight, based on the total weight of the coal ash.) coal ash" obtained according this prior art process is generally about 20%, even though the activity of such modified coal ash is somewhat raised, it is still used together with CrFe ash containing mainly β-dicalcium silicate ($\beta$-$C_2S$) and γ-dicalcium silicate ($\gamma$-$C_2S$) to produce masonry cement of low grade below 325# (see CN. 9110608.4). Therefore, its use is rather narrow and fails to essentially satisfy the demaned of the entire and highly-valued use of coal ash. Another difficulty in use of coal ash lies in that the detrimental effect of the residual carbon in the coal ash (or as usually called "loss on ignition") impairs the quality and performances of the resulted coal ash cement product. The residual carbon in the coal ash is porous and possesses a very strong water adsorption, its existence leads to a increase of water demand for the ash and lowers strength of the coal ash agglomerate, resulting in the decreasing of the anti-permeating and anti-frozen performances of the resulted product; at the same time the residual carbon tends to form a hydrophobic membrane on the surface of the product, which hinders the active substance from hydrating reaction, giving a dispersing and destructive effect on aggregation of the coal ash; additionally, the existence of residual carbon also lowers the utilization rate of coal's thermal value and the boiler's thermal efficiency.

According to the prior art, steam power plant and the cement works belong to different industrial categories and are respectively operated and administered, they have respectively their own problems.

SUMMARY OF THE INVENTION

Based on the knowledge that there exist, in the existing technology of cement clinker production characterized by slow burning/slow cooling, the problems of poor heat transfer and product quality, the present inventors have devoted them selves since long to developing new technologies for cement clinker production. Through long term's observation and research on the combustion characteristics of various furnaces and kilns, and being enlightened by the thermal engineering conditions of the coal-powder-burning boiler system characterized by "fast burning" of the coal powder and "fast-cooling" of the coal ash, the inventors present the concept of utilizing such a favourable thermal engineering condition of the coal-powder-burning boiler system to produce cement clinker. In order to embody this concept, three main problems need to be solved. Firstly, how to have the chemical composition of the coal ash obtained from the coal-powder-burning boiler meeting the requirement of the desired cement clinker; secondly, how to make the coal ash substances have the mineralizing reaction during coal combustion, so as to form substantial amount of mineral composition which possesses good hydraulic cementitious activity; thirdly, how to assure that the mineralizing reaction of coal ash substances does not consume any heat energy from the furnace chamber so as to keep the furnace chamber at high temperature condition and to maintain the steam-supply capability of the boiler.

In order to solve the above three problems, the present inventors conduct a deep-going research on the combustion course of the coal powder in the boiler furnace chamber and the physico-chemical properties of the coal ash, they find that the principal chemical components of coal ash in China are four oxides: $SiO_2$, $Al_2O_3$, $Fe_2O_3$ and CaO, which are just the same as the principal chemical components of the cement clinker (referring to its oxide form), the chemical components and their contents of both the cement clinker and coal ash in China, respectively, are in Table 1.

TABLE 1

Contents of the chemical components of coal (fly) ash and of cement clinker (weight %)

| | $SiO_2$ | $Al_2O_3$ | $Fe_2O_3$ | CaO | MgO | $SO_3$ | $R_2O$ | C |
|---|---|---|---|---|---|---|---|---|
| Coal (fly) ash | 33,9–59.7 | 16.5–35.4 | 1.5–15.4 | 0.8–10.4 | 0.7–1.8 | 0–1.1 | 0.7–3.3 | 1.0–23.5 |
| cenment clinker | 20–40 | 4–7 | 3–3.5 | 62–68 | <5 | | <1.3 | |

It can be seen from Table 1 that, though both of them contain same sorts of oxides, yet their content ranges of the components are rather different, the main distinctions that the CaO content in the coal ash is far lower than that of the cement clinker, this lower Ca content is the main cause why the coal ash possesses no or little mineral phases such as dicalcium silicate ($C_2S$), tricalcium silicate ($C_3S$), tricalcium aluminate ($C_3A$) and tetra calcium ferrous aluminate ($C_4AF$) etc. which are contained in cement clinker and endows it with hydraulic cementitious ability. In view of the above-indicated features, the present inventors realize that it is possible to make the chemical composition, mainly the calcium content, of the combustion residue meeting that of the desired cement clinker, if the coal is, based on the content and chemical composition of the coal ash substance contained in raw coal and in compliance with the requirement for achieving the cement clinker's chemical composition, blended with an admixture containing mainly calcium-rich substance, substantially in form of CaO, and optionally some other additives such as mineralizing agent, crystal seed, early strong agent and loosener etc., hereinafter referred to as "AMC". The inventors further realize that the burning and forming temperature of the cement clinker is about 1450° C., or 1300° C. when mineralizing agent is added thereinto, while the temperature range 1300–1700° C. in the high temperature zone of the furnace chamber of the coal-powder-burning boiler can well satisfy the temperature requirement for burning and forming cement clinker, the above-indicated blended coal mixture is ready to form large amount of cementitious mineral phase when it is burnt at high temperature in the furnace chamber. The present inventors have also conducted a deep-going research on the cause why prior art, particularly the prior process known from the "Development of high calcium content coal ash and its use for cement production and saving clinker, <<Chinese Building Material Science And Technology>>, No.5,1993." fails to effectively modify the coal ash and endow it with good hydraulic cementitious activity by adding lime stone; they find that in the said prior art process the added lime stone $CaCO_3$, while decompose into CaO and $CO_2$ in the furnace chamber, absorbs a rather large amount of heat from the chamber, thus resulting in detriment to the high temperature condition of the furnace chamber and decreasing the steam power supply capability of the boiler, so that the addition amount of $CaCO_3$ can only be very limited and the CaO content in the coal ash finally obtained in this way fails to exceed 20%, still far behind the calcium content of the cement clinker; they also find that the residence time of the coal powder in the high temperature zone of furnace chamber is but totally 2-seconds, while decomposition of $CaCO_3$ into CaO and $CO_2$ needs actually over 2 seconds, thus the formed CaO has not enough time in the chamber to have the mineralizing reaction with the other chemical components, and the coal ash obtained by such process contains by no means significant amount of cementitious mineral phase, still remaining to be a coal ash with low cementitious activity. Thus, the resulted coal ash is not so modified for producing portland coal ash cement of high grade and has no possibility to be directly used as cement clinker in high grade cement production.

Based on the above knowledge, the present inventors discover that the above mentioned two problems existed in the prior art process in which lime stone is added can be completely overcome if AMC is blended with the coal, namely, there exists no problem of the heat absorption of lime stone decomposition in the furnace, on the contrary, as the mineralizing reaction between CaO and coal ash substances is an exothermic reaction, these reactions are favourable for raising the furnace chamber temperature and improving the combustion and are favourable for maintaining or even raising steam power supply, hence the AMC addition amount can be greatly increased, resulting in the CaO content in the residue to reach 20–70% after the combustion of the blended coal mixture; additionally there exists no problem of time consumption for $CaCO_3$ decomposition as the AMC mainly containing calcium-rich substance, substantially in form o CaO, is now blended, the CaO has sufficient time to conduct the mineralizing reaction with coal ash substances during the coal powder combustion in the furnace chamber and to form the mineralized substances with hydraulic cementitious activity.

The present inventors also further find that if the AMC is sufficiently and finely interground with coal, these two sorts of powder will have intimate contact each other when this finely interground powder is injected into the furnace chamber for combustion, they are not only exothermal fuel, but also the reactants as such for the mineralizing reaction during the combustion; it not only suspends and burns in the furnace at a high combustion speed, but also conduct a homogeneous direct-contact heat-transfer and masstransfer, the combustion heat releasing and the mineralizing reaction take place almost simultaneously and quickly finish. The oxides in the coal ash substances such as $SiO_2$, $Al_2O_3$ and $Fe_2O_3$ exist in the form of kaolin ($Al_2O_3.2SiO_2.2H_2O$), their heat-absorbing dehydrolization and decomposition coincide with the exothermic mineralizing reaction with calcium-containing substances contained in the AMC, assuring the high temperature burning between the AMC and the oxides newly-generated from the decomposition of the coal ash substances and rapid formation of mineral phases such as $C_2S$, $C_3S$, $C_3A$ and $C_4AF$ etc. which have hydraulic cementitious activity. The calculation results obtained from the thermal balance for the entire decomposition heat absorption during the decomposition and heat release during the mineralizing reaction show that, as a whole, the heat release is larger than the heat absorption, this further guarantees a favourable high temperature condition of the furnace chamber and the boiler's steam power supply capability. After exiting from the furnace chamber, the combustion residue is quickly cooled and the microcrystals formed in mineralizing reactions have not enough time to develop themselves during this fast cooling course, and some of them appears to be in the vitroclastic microcrystal intermediate phase which possesses large free energy and many structural defects, thus it can further raise the hydraulic cementitious activity of the residue and make it substantially into cement clinker with good hydraulic cementitious activity.

Therefore, one object of the present invention is to provide a novel process for "producing both steam power and cement clinker simultaneously in one apparatus. According to this process, the two courses of steam power supplied by coal powder combustion and cement clinker production are combined in one apparatus composed mainly of coal-powder-burning boiler system and are carried out simultaneously without increasing the coal consumption of the boiler system.

Another object of the present invention is to provide a new type of cement clinker which is obtainable according to the inventive process. A most important difference of it from the conventional cement clinker produced by prior art lies in that, under the premise of having basically same chemical composition for the two, the cement clinker of the present invention is obtainable employing the new "fast-burning and fast cooling" technology and has higher hydraulic cementitious activity than that of the conventional one. In order to distinguish it from the conventional cement clinker, the cement clinker of the present invention is called "fast-burnt cement clinker" hereafter.

Further another object of the present invention is the cement made of such fast-burnt cement clinker. The fast-burnt cement clinker can be used as the sole cementitious active substance or as main part be mixed with a minor amount of conventional cement clinker to be combining with other conventional cement additives such as gypsum to be interground into cement. In order to reflect the distinctive characeristics of the cement products made solely or mainly of the fast-burnt cement clinker of the present invention, this cement is designated as the "fast-burnt cement" here below.

Further another object of the present invention is to provide a set of apparatus for simultaneous production of steam power and the fast-burnt cement clinker and, optionally, preparing the fast-burnt cement from the fast-burnt cement clinker.

Still another object of the present invention is to provide a process for simultaneous production of steam power and direct modification of coal ash during coal powder combustion in the boiler furnace. According to this process, a fast-burnt modified coal ash possessing good hydraulic cementitious activity can be produced by adding AMC into raw coal while assuring the steam power supply without increasing coal consumption.

Still another object of the present invention is to provide the fast-burnt modified coal ash obtainable according to the above-indicated process. This fast-burnt modified coal ash possesses good hydraulic cementitious activity and can be used as the sole cementitious active substnace or as main active substance together with a small amount of conventional cement clinker, for producing portland fast-burnt modified coal ash cement with good performances. So, this fast-burnt modified coal ash is in fact the fast-burnt cement clinker.

Still another object of the present invention is a new kind of cement prepared using this fast-burnt modified coal ash. The fast-burn modified coal ash can be used as the sole cementitious active substance, or as main active substance together with a small amount of conventional cement cliker, and further mixed with some other conventional cement additive and then be ground into portland fast-burnt modified coal ash cement.

Still another object of the present invention is the use of coal-powder-burning boiler system in the production of the fast-burnt modified coal ash.

Still another object of the present invention is to provide a apparatus which can embody the inventive process for simultaneous production of steam power and fast-burnt modified coal ash and, optionally, for making the latter into Portland fast-burnt modified coal ash cement. The existing conventional coal-powder-burning boiler system may be used to construct the "inventive" apparatus for simultaneous production of steam power and fast-burnt modified coal ash portand cement, the only additions thereto are: a set of AMC pregrinding and blending system is connected ahead of the coal grinding machine and a set of material blending, pulverizing, packing and/or storage system for coal ash cement products is connected behind the collection of the fast-burnt modified coal ash.

Still further another object of the present invention is to provide a process for combining sulfer contained in the coal into the coal ash and for further removal of the $SO_2$ from the flue gas of the coal-powder-burning boiler.

BRIEF DESCRIPTION OF THE DRAWINGS

The present invention will now be described with reference to the following drawings.

FIG. 8 is a polarizing microscopic photo of the physical phase analysis of the sample which is same as that of FIG. 6.

FIG. 9 is a polarizing microscopic photo of the physical phase analysis for the fast-burnt clinker obtained according to a preferred embodiment of the present invention.

FIG. 10 is a polarizing microscopic photo of the physical phase analysis for the fast-burnt modified coal ash obtained according to another preferred embodiment of the present invention.

DETAILED DESCRIPTION OF THE INVENTION

Figure 1:
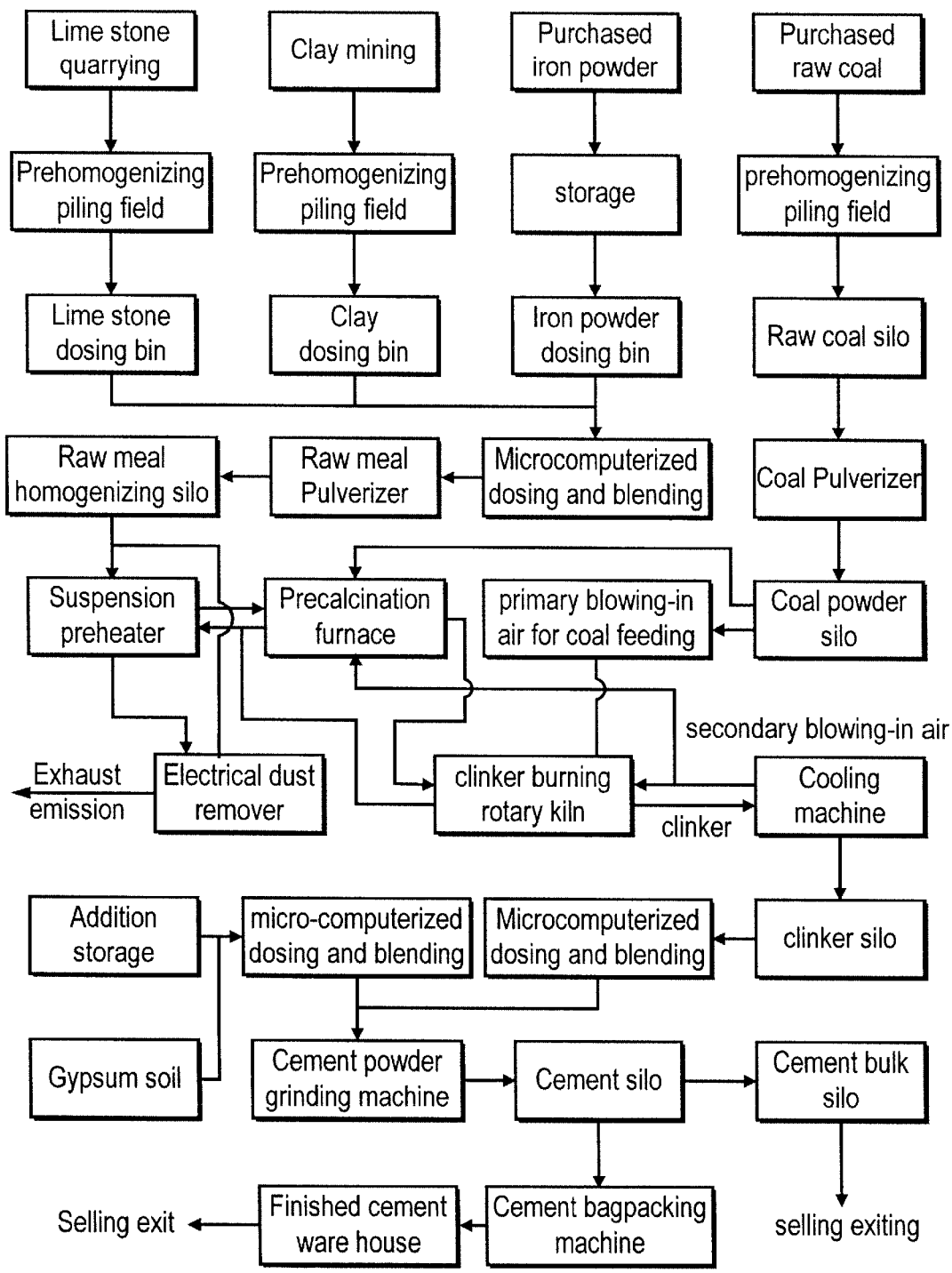
FIG. 1 is a technological flowchart layout for an out-of-kiln predecomposition dry process rotary kiln.

In the preceding portion and the following portion of the present Description, the term "cement clinker" means all the silicate hydraulic cementitious materials, in a broad sense, possessing hydraulic strength which complies with GB175-92. According to such a definition, the products prepared according to the processes of the present invention, including the fast-burnt cement clinker and the fast-burnt modified coal ash, both belong to "cement clinker".

The term "coal ash substance" means the components contained in raw coal which remain in residual ash and slag after coal's combustion.

The term "coal ash" means the coal residue after combustion including fly ash and slag.

AMC mainly contains calcium-rich substance substantially in form of CaO, wherein it may be only CaO or commercial lime or may contain minor amount of $CaCO_3$ for which the absorbed heat by $CaCO_3$ decomposition into CaO and $CO_2$ shall be less than the surplus of heat release from the mineralizing reaction. Additionally in order to promote direct-formation of cementitious mineral phase in the furnace by the reaction between AMC and the coal ash substances the said AMC may optionally further contain 0–2% mineralizing agent and/or 0–7% crystal seed and/or 0–2% early strong agent and loosener. The mineralizing agent is mainly used for speeding up the mineralizing reaction, it may be any of the mineralizing agents used for producing conventional cement clinker such as fluorite. Adding crystal seed thereinto is to speed up the formation of the mineral crystal phase so that the crystal grains can formed quickly, the crystal seed can be mineral crystal phases-containing portland cement clinker in from of fine crystal grain or other substances. The purpose of adding early strong agent and loosener is to further improve the early hydraulic cementitious strength of the fast-burnt cement clinker/fast-burnt modified coal ash and to avoid or reduce the ash slag's coke-like agglomerates on the heat-conducting area of the furnace chamber, said early strong agent and loosener can be any one of the early strong agents usually used in conventional cement production such as barite. The contents of said mineralizing agent, crystal seed as well as early strong agent and loosener are all calculated based on the total weight of the fast burnt cement clinker or of the fast-burnt modified coal ash.

As is indicated above, the normal coal ash from the coal-powder-burning boiler differs itself from the cement clinker in two aspects of property: one is "silicon-rich and calcium-lacking"; the other is that the various components thereof exist basically in the form of oxides, containing little silicate mineral crystal phase with hydraulic cementitious activity. In order to utilize this coal ash substances and to have them converted into cement clinker components, the chemical composition of the combustion residue substances should, from technical point of view, meet the requirement of chemical (elements) composition of the cement clinker, so as to provide the fundamental material condition for the occurance of direct mineralizing reaction for the coal ash substances during combustion in the furnace. The present invention achieves this object by blending certain amount of AMC into coal to obtain a blended coal mixture. The specific blended amount of AMC depends on the coal chemical analysis results such as that of coal ash substance content, especially calcium content. The chemical elemental composition of the fast-burnt cement clinker obtained after combustion of the blended coal mixture should be made to meet the requirement for the elemental composition of the desired cement clinker, with respect to the calcium content, expressed as CaO % by weight, the fast-burnt cement clinker should generally contain calcium oxide in range of 20–70%, preferably 30–65%, and most preferably 45–65%.

In order to utilize the coal ash substances and to covert them into fast-burnt cement clinker, in addition to that various principal elements and their contents in the residue substances of the blended coal mixture are made by the coal-blending to meet that of requirement of the cement clinker, conditions as favorable as possible for the physico-chemical reaction have to be provided from technical point of view, so that the components of the residue substances of the blended coal can quickly have physico-chemical reaction in the furnace and form the above-indicated cementitious mineral phases in a substantial amount. Firstly, the blended coal mixture is fully ground into powder, or the AMC is preground into powder and then mixed homogeneously with coal through intergrinding so that the AMC powder has close contact with the coal powder. The fineness of the ground powder should in general reach 4,900 opening/cm2 with sieve residue less than 30%, preferably less than 15% and most preferably less than 6%. Secondly, sufficiently high temperature condition should be provided for the combustion and mineralizing reaction of such blended coal powder which has sufficient fineness and close contact between coal and the AMC. To achieve this, the blended coal powder are injected into the furnace chamber of the coal-powder-burning boiler and are fully combusted in the high temperature zone thereof at above 1300° C., preferably 1350–1700° C. and most preferably 1400–1550° C. The term "fully combusted" means that the loss on ignition of the resulted fast-burnt cement clinker shall be less than 3%. In order to assure the blended coal fine powder to be fully combusted and to facilitate the mineralizing reaction, some other measures can be taken such as adjusting the air flow and/or flow rate from the primary and secondary blower (s) to further improve the combustion in the furnace, to raise the temperature and to enlarge the high temperature zone, e.g., the high temperature zone can be made to reach 1350–1700° C., in addition to that the AMC components have the exothermic mineralizing reaction with the coal ash substances, substantially ensuring and improving the high temperature condition of the furnace chamber. Additionally, the blended fine coal powder or its residue after combustion are made to have a sufficient residence time in the high temperature zone through proper furnace chamber design, the average residence time should in general not be shorter than 2 seconds, preferably not shorter than 4 seconds and most favourably not shorter than 6 seconds. These physico-chemical reaction conditions assure that the AMC and the coal ash substance can conduct mineralizing reaction quickly and form cementitious mineral phase of the portland cement clinker in substantial amount, endowing the fast-burnt cement clinker of the present invention with good hydraulic cementitious activity. After being burnt, the fast-burnt cement clinker exits the furnace chamber in the form of fine powder or in the form of melt slag, and its temperature drops quickly from about 1200° C. to below 200° C. in 1–5 seconds; In this fast-cooled course, the components in form of microcrystal have not enough time to further develop their crystal, thus the substantial proportion of them appear to be in vitroclalstic micro-crystal intermediate phase which has large free energy and many structure defects, further improving the hydraulic cementitious activity of the fast-burnt cement clinker of the present invention.

Figure 3:
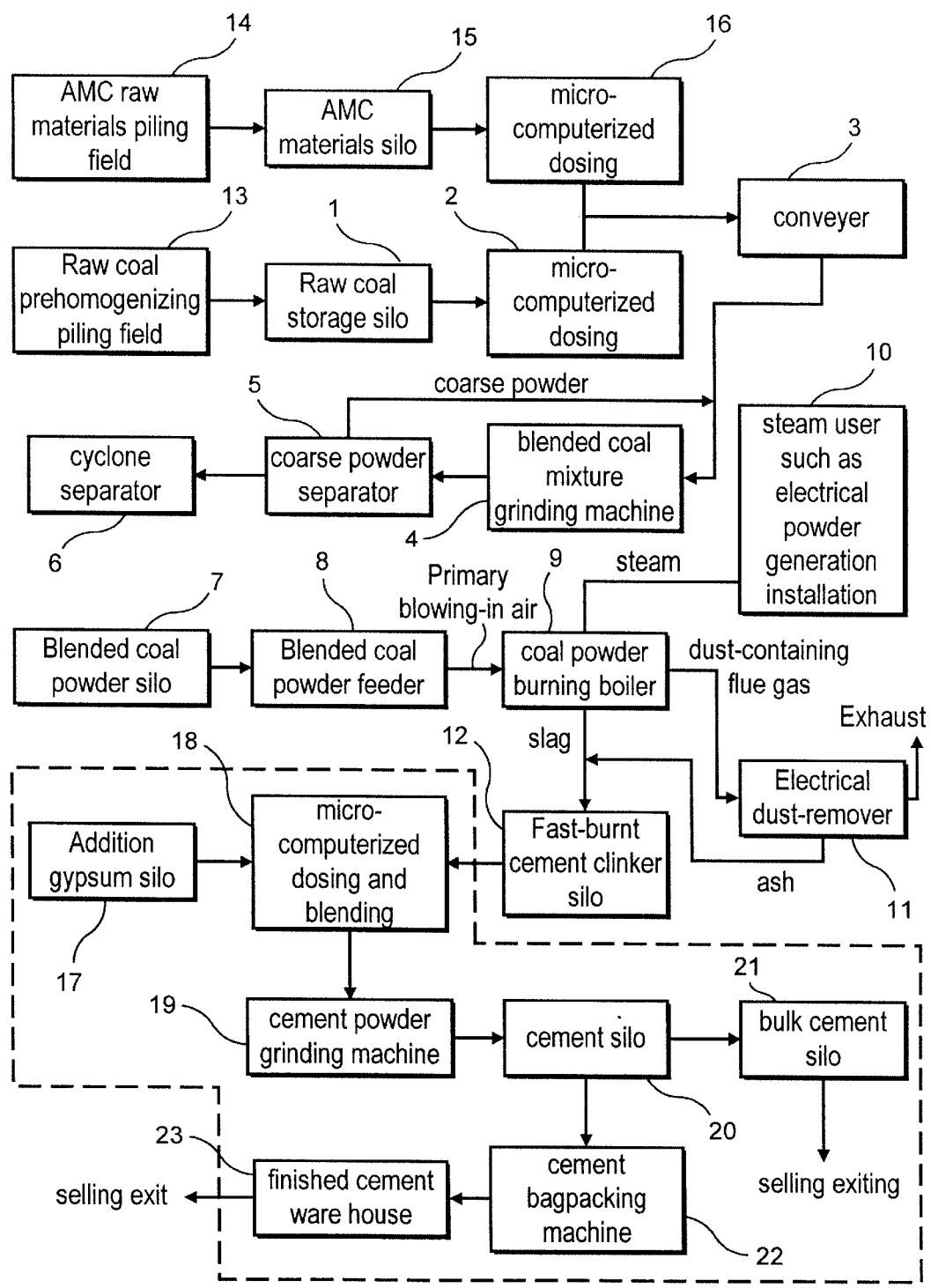
FIG. 3 is a layout of the technological flowchart of the apparatus specially designed according to the present invention for simultaneous production of steam power and the fast-burnt cement clinker in one apparatus and, optionally, preparing the fast-burnt cement from the fast-burnt cement clinker.

The process according to present invention can be favourably carried out in a specially-designed apparatus. FIG. 3 is a flowchart of a set of the apparatus for producing both steam power and the fast-burnt cement clinker similtaneously and then optionally producing the latter into the fast-burnt cement.

Referring to FIG. 3, the raw coal is prehomogenized in the prehomogenizing piling field (13) so as to assure the stability of the coal quality, and then is measured and fed into the conveyer (3) through the raw coal silo (1) after the microcomputerized dosing and blending device (2); the AMC is delivered into the AMC materials bin (15) from its raw material piling field (14) and is measured and fed into the conveyer (3) after the microcomputerized dosing and blending device (16), the AMC is blended with the raw coal at the conveyer (3) to form the blended coal mixture which enters the blended coal mixture intergrinding machine (4) and the coarse powder separator (5) for being ground here into the required fineness; the ground coal powder then enters the cyclone separator (6) and via the blended coal powder silo (7) and the blended coal powder feeder (8), delivered into the furnace chamber of the coal-powder-burning boiler (9) by the primary blowing-in air for combustion and reaction; the steam produced from the boiler is delivered to the steam power user such as electrical power generation apparatus (10), main part of dust contained in flue gas is collected by electric dust remover (11), and the exhaust gas is emitted into the air, while the fast-burnt cement clinker materials collected in the form of slag and of fly ash are delivered together into, the fast-burnt cement clinker silo (12); such cement clinker can not only be directly sold, but also enter the optionally connected system indicated in the dotted line frame to be prepared into finished cement product and to be sold. The system in the dotted line frame comprises additives and gypsum bin (17), microcomputerized dosing and blending device (18), cement pulverizing machine (19), cement silo (20), cement bulk silo (21) and selling exist, cement bag-packing machine (22), finished cement warehouse (23) and finished cement selling exist.

Figure 2:
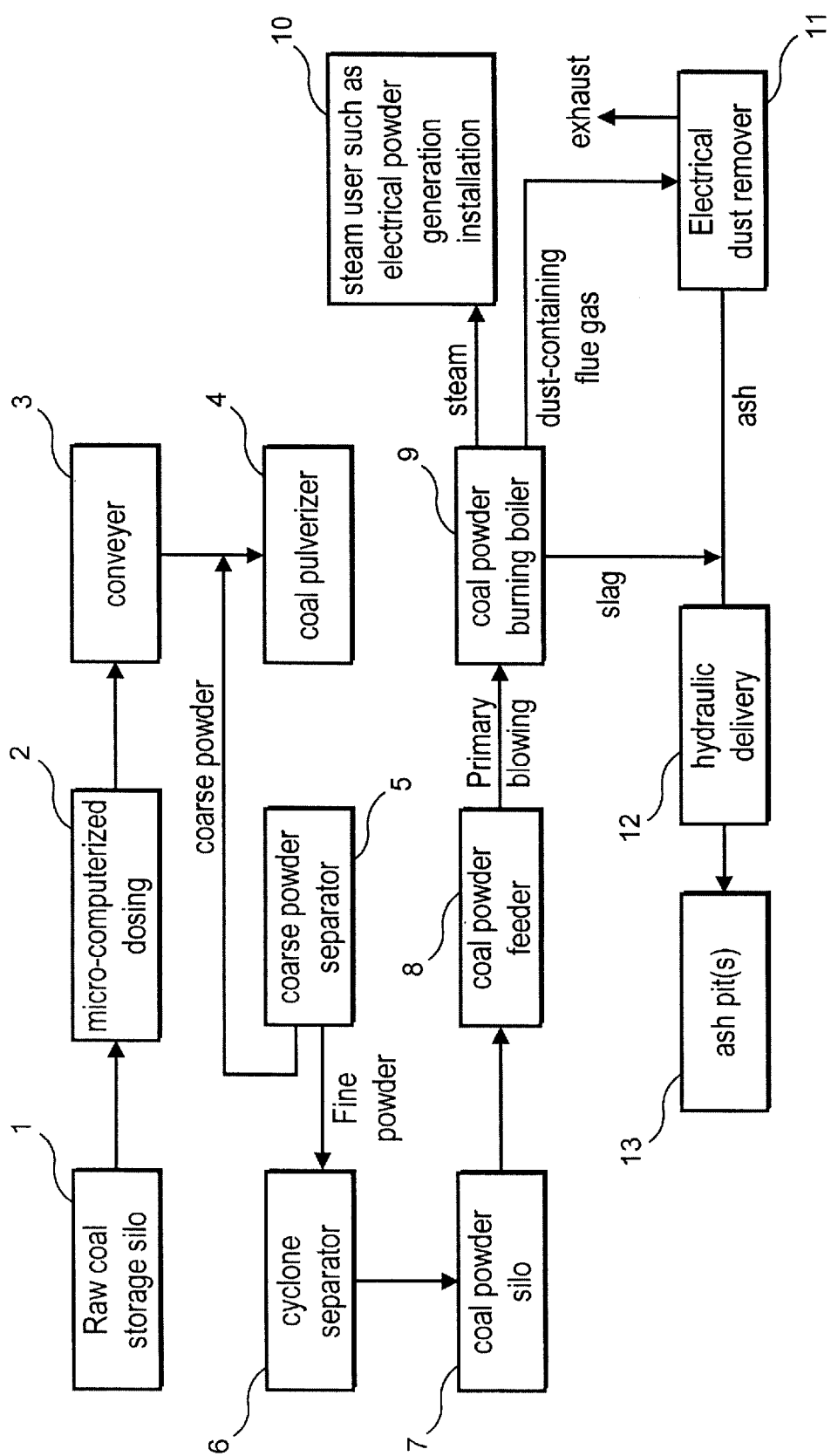
FIG. 2 is a technological flowchart layout for a coal-powder-burning boiler system.

By a comparison between FIG. 3 and FIG. 2 it can be seen that the main parts of the apparatus as indicated in the flow chart of FIG. 3 are basically same as that of the existing coal-powder burning boiler system as indicated in FIG. 2 the both apparatus comprise the raw coal blending, pulverizing and delivery system; the coal-powder-burning boiler and connected steam power user such as electrical powder generation equipment, the product or ash and slag collection and post-treatment system. However, the apparatus according to present invention further comprises: AMC piling storage, blending and dosing system, raw coal prehomogenizing piling field, and a fast-burnt cement clinker silo supplemented at the rear portion of the apparatus, may also comprise the optitionally connected fast-burnt cement blending, pulverizing, packing and storage system. Furthermore, the treatment capability of the coal-grinding machine needs to be enlarged so as to meet the requirement raised by the increased gringing amount of the AMC; meanwhile, the steel grinding ball size distribution needs to be properly adjusted so as to meet the requirement onto the poweder fineness according to the present invention; and if necessary, the furnace chamber size and structure parameters needs to be so determined as to have the residence time of the fine powder in the high temperature zone above 1300° C. of the furnace chamber being not less than 2 seconds, preferably not less than 4 seconds and most preferably not less than 6 seconds. One important merit of such a specially designed apparatus is that, in the apparatus design, the requirements for producing the fast-burnt cement clinker of high quality can be sufficiently considered and met so that an optimized techno-economic benefit can be achieved at ease for the process for producing both steam power and cement clinker simultaneously according to the invention. Additionally, a full use of the experiences in the design, construction and operation of the existing coal powder-burning boiler system can be readily made and hence the reliability of the apparatus according to the invention is guaranteed.

Figure 4:
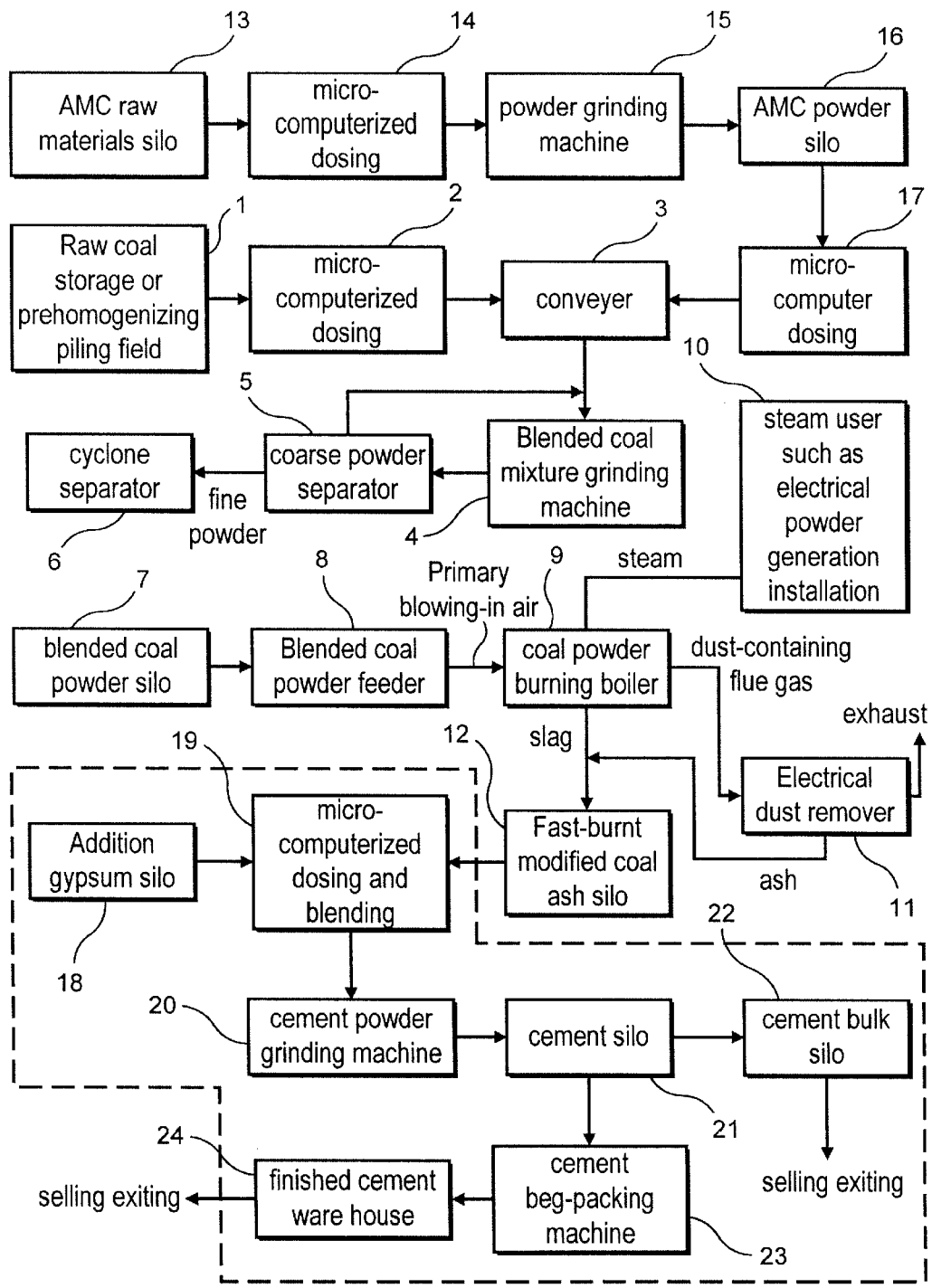
FIG. 4 is a layout of the technological flowchart of the apparatus according to the present invention using existing conventional coal-powder-burning boiler system for simultaneous production of steam power and the fast-burnt modified coal ash and, optionally, making the latter into portland fast-burnt modified coal ash cement.
Figure 5:
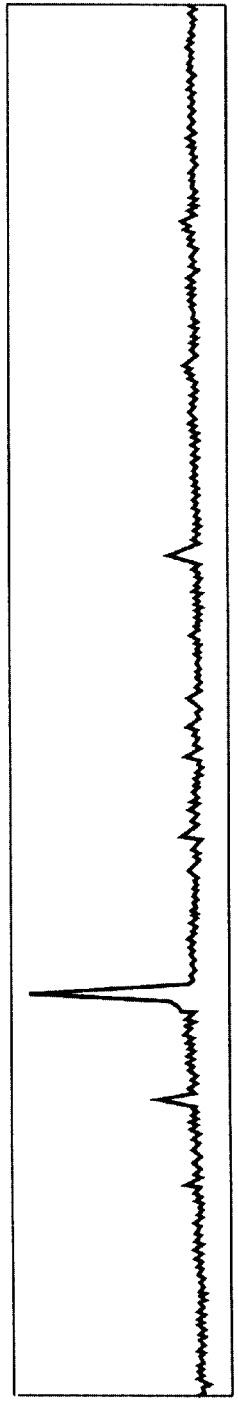
FIG. 5 is a x-ray diffraction spectrogram (XRD) of a coal ash sample not yet modified (sample taken from the No.2 coal powder burning boiler system of Jilin thermal power plant).

The process of the present invention can also be carried out favourably using a set of apparatus formed after some additions and changes to the existing coal-powder-burning boiler system. FIG. 4 is a flowchart of a set of apparatus which can favourably embody the process for producing both steam power and the fast-burnt modified coal ash and for optionally producing the latter into the portland fast-burnt modified coal ash cement. The present invention is in this case aiming at turning the coal ash substances into fast-burnt modified coal ash which is in fact the fast-burnt cement clinker with good hydraulic cementitious activity while the normal steam power capacity is ensured. By a comparison between FIG. 4 and FIG. 3, it can be found that the apparatus elements and their disposition as indicated by the two flowcharts are almost the same, the only exception is that in order to fully utilize the existing coal-grinding machine and simultaneously meet the increased grinding requirement for the AMC, a set of AMC pregrinding machine is additionally installed precedingly thereto, the AMC is preground into powder and then blended with the raw coal, and then the blended coal mixture is interground pinto powder. For the sake of saving paper space, the various equipments or devices as well as material flows are not discribed stepwise here. By a comparision between FIG. 4 and FIG. 2, it can be seen that a set of AMC piling and storage, pregrinding, storage as well as measuring and feeding system is additionally connected to the existing coal powder-burning system, forming the apparatus according to the present invention; if necessary, a raw coal prehomogenizing piling field is added ahead of the raw coal silo so as to assure the stability of the coal quality; the original coal ash delivery and ash-piling system behind the ash and slag collection is removed and replaced by a system of the fast-burnt modified coal ash silo, and an optionally attached fast-burnt modified coal ash cement system consisting of material blending, pulverizing, cement storage and packed cement product storage elements, with other elements of the existing coal-powder burning boiler being kept as such. One important merit of this apparatus formed by reforming the existing boiler system is that the existing boiler system can be fully used and, only a small amount of investment is required or even the saved cost for coal ash delivery and ash piling pits extension spent each year in the past is, on the premise of ensuring steam power production capability without increasing coal consumption, enough to complete the reformation of the existing boiler system and achieve the object of producing steam power and fast-burnt modified coal ash simultaneously and optionally process the latter into the fast-burnt modified coal ash cement according to the present invention. Another merit of this apparatus is that the well-practiced operational experience for the existing coal-powder-burning boiler system may be entirely taken as a reference and the entire apparatus can be operated with good reliability.

Because the inventive process for producing both steam power and the fast-burnt cement clinker/fast burnt modified coal ash possesses the new technological feature, i.e., fast-burning and fast cooling, which is in substance distinguished from the prior slow burning and slow cooling technology for cement clinker production, therefore some novel physico-chemical features are contributed to the inventive fast-burnt cement clinker/fast-burnt modified coal ash. By means of the X-ray diffraction analysis and the polarizing microscopic physical phase analysis on several typical samples, the obtained results show that the fast-burnt cement clinker/fast-burnt modified coal ash according to the present invention have remarkable silicate mineral phase XRD features; among them, especially, the dominant portion is $C_2S$. The results from cement mechanical test show that both the early and later strength of the cement prepared using the fast-burnt cement clinker/fast-burnt modified coal ash as sole or main active substances are high. This shows that it belongs to portland cement clinker series on the one hand and possesses novel features of belit cement on the other hand.

Because the added AMC has a exothermic mineralizing reaction with the coal ash substances, it is favourable for improving the combustion in the furnace chamber, and further because of the fully intergrinding of the blended coal mixture according to the present invention, the resulted finness of the blended coal powder is even more favourable for the full combustion of coal; these two factors are both favourable for lowering the residual carbon in the fast-burnt cement clinker/fast-burnt modified coal ash, this not only eliminates the infavourable influence of the residual carbon on the product quality, but also lowers the coal consumption and saves energy.

The fast-burnt cement clinker/fast-burnt modified coal ash of the present invention possesses good hydraulic cementitious activity, the cement product prepared using them as the sole or main cementitious active substance e.g., its content is in. range of 65–95%, based on total weight of the cement product, complies with GB 175-92 or GB 1344-92 and its strength grade is generally above 325#, a better is above 425# and a further better is above 525#.

The process of the present invention can further be used as that for combining the sulphur contained in coal into the ash and slag and removing $SO_2$ from the flue gas of the coal-powder-burning boiler. The AMC mainly containing calcium-rich substance, substantially in form of CaO, as well as optionally tile above-indicated mineralizing agent, the crystal seed and the early strong agent and loosener is blended into the coal; the blinding amount of the AMC is required to have the resulted ash and slag containing CaO in range of 20–70% (based on the total weight of the coal ash same below); this blended coal mixture is homogeneously mixed and finely interground to the fineness of 4,900 opening/cm2 with sieve residue being less than 30%, preferably less than 15%, and more preferably less than 6%; such blended coal mixture powder is then injected into the furnace chamber of the boiler so that they can be fully burnt in the high temperature zone wherein sulfur is easy to react with calcium and other components, forming cementitious mineral substances such as calcium sulfate ($CaO_4$), dehydro calcium sulphoaluminosilicate ($4CaO.3Al_2O.CaSO_4$), and calcium fluo-sulfosilicate ($3Ca_2SiO_4.3CaSO_4.CaF_2$) etc., thus the sulfur in the form of $SO_2$ emitted along with the flue gas into the atmosphere in the least is now transferred into the ash and slag converting into harmless and beneficial cementitious substances and the pollution of $SO_2$ is eliminated or significantly reduced.

In one comparative example of the present invention, a modification test is made on the coal ash of the coal powder burning boiler according to the prior art process by adding lime stone into coal.

A chemical composition analysis on the obtained modified coal ash according to the known process indicates that its CaO content is below 20%, the result of the strength test on the cement prepared using this modified coal ash shows that it can not be used as the sole or main active component, but only as admixture material for preparing modified coal ash cement.

In another comparative example of the present invention, the mineralizing agent, the crystal seed and the early strong agent and loosener above-indicated are added thereinto in addition to lime stone, so as to conduct a further test on the modifying effect of the modifier, comprising mainly of lime stone, on the coal ash. The results of x-ray diffraction and polarizing microscopic photograph physical phase analyses show that the product obtained by this process has but very weak x-ray diffraction peak of the typical mineral phase of the portland cement clinker and has very few silicate mineral crystal phases. The results of the strength test on the cement prepared using the modified coal ash obtained in this way show that this modified coal ash still can not be used as the sole or main active component, only as an admixture material for preparing modified coal ash cement. All these results show that this process is incapable to achieve significant modification effect.

In one embodiment example of the present invention the AMC which only contains calcium-rich substance, substantially in form of CaO is blended in a raw coal, and the fast-burnt modified coal ash sample obtained according to the present invention displays typical x-ray diffraction characteristics of the cementitous mineral substances, the portland fast-burnt modified coal ash cement obtained using this fast-burnt modified coal ash as the sole cementitious active component has a strength grade above $325^3$ with the other performances also being qualified.

In one preferred embodiment example of the present invention, the AMC mainly containing the calcium-rich substance, substantially in form of CaO, and the mineralizing agent, crystal seed and early strong agent and loosener is blended into the coal used for existing coal-powder-burning boiler, the polarizing microscopic photograph analysis on the fast-burnt modified coal ash obtained according to the invention displays a significant amount of silicate mineral crystal phases and substantial amount of vitroplastic microcrystal intermediate phases; the strength grade of the modified portland coal ash cement can usually reach 425# and a better can reach 525#, with the other performance being qualified.

In another preferred embodiment example of the present invention, the AMC mainly containing the calcium-rich substance, substantially in form of CaO, and mineralizing agent, crystal seed and early strong agent and loosener are blended into the coal used in the newly designed apparatus for producing both steam power and the fast-burnt cement clinker according to the present invention. The fast-burnt cement is prepared using the obtained fast-burnt cement clinker as the sole cementitious active substance, the strength grade of which can usually reach 425#, a better one can reach above 525#, with the other performances being also qualified.

In another embodiment example of the present invention, the effect of removing $SO_2$ from the flue gas according to the present invention has has also been tested, the test result tells good value for $SO_2$ removal.

The present invention has many prominent merits.

The first prominent merit of the present invention is that it represents a breakthrough on the traditional cement clinker production technology and create the technology for "fast-burnt and fast cooled" cement clinker production. By means of the X-ray diffraction analysis on the fast-burnt cement clinker/fast-burnt modified coal ash of the present invention, the obtained results indicate that the fast-burnt cement clinker/fast-burnt modified coal ash of the present invention displays characterizing XRD peaks of the typical silicate mineral phases; and among these phases, the $C_2S$ content is higher than that of $C_3S$, which shows that the obtained products possesses significant feature of belite cement; The mechanical test results show that not only the later strength is high which is common for belite cement, but also the early strength is good for the cement prepared using the fast-burnt cement clinker/fast-burnt modified coal ash of the present invention as active component. This shows that the present invention provide the process for producing new type belite cement in industrial scale.

The second prominent merit of the present invention is that in an apparatus consisting mainly of coal-powder-burning boiler simultaneous production of both steam power and the fast-burnt cement clinker/fast-burnt modified coal ash is realized, wherein the favourable exothermic feature of the mineralizing reaction between CaO and coal ash substances is fully used, enabling simultaneous production of both steam power and fast burnt cement clinker/fast burnt modified coal ash only in one set of apparatus while not increasing the coal consumption. This technology makes full use of the coal ash substances to have them converted into the fast-burnt cement clinker/fast-burnt modified coal ash of high value, being equivalent to saving the costs for the construction, operation and administration, saving most of the material and energy consumption of conventional cement works with the same cement productivity, achieving a very high technical economic benefits.

The third prominent merit of the present invention is the outstanding environmental protection benefit. First, the coal ash pollution is eliminated. The coal-powder-burning boiler system no longer emits waste coal ash, this can not only save such costs and land for ash piling pits construction or extension and save the power consumption for transporting the coal ash to the ash piling pits, but more important, can also eliminate radically the more and more serious environmental pollution resulted from the coal ash accumulated year after year which enters with wind and rain water to the atmosphare and neibourhood land. Secondly, its pollution on the atmospheric environment is significantly reduced; as the sulfur in forms of elemental sulfur and of the sulfur-containing compound contained in coal can form $CaSO_4$ and further form $4CaO.3Al_2O_3.CaSo_4$ and $3C_2S.3CaSO_4.CaF_2$ in the course of mineralizing reaction, all these minerals are cementitious substances with early strong activity, as the result, the product quality is raised on one hand, the sulfur amount emitted on the atmosphere along with the exhaust gas in the form of $SO_2$ is significantly lowered on the other hand; Additionally, as what is emitted from the boiler is the fast-burnt cement clinker/fast-burnt modified coal ash, which are different in substance from the prior art coal ash and are easier to be collected by the electric dust-remover, so the dust-collection efficiency thereof can automatically raise 1.9% according to the existing experimental result (see Table 2).

inventions, but all these variations and improvements will fall into the protection scope of claims of the present invention.

The percentage contents in the present Description and Claims are all expressed as percentage by weight except otherwise specially stated.

EXAMPLE 1

The present embodiment example involves the embodiment of the process for producing both steam power and cement clinker simultaneously. It is carried out in the newly-designed apparatus according to the invention, the flow chart of which is as seen in FIG. 3. The temperature in the furnace chamber of the apparatus is in range of 1300° C.–1700° C., the residence time in the furnace chamber of the blended coal mixture is above 6 seconds, the AMC used contains but lime which is a commercial commodity with CaO content of about 92%. The chemical analysis results for the non-combustable substances in coal are listed in Table 3 (0-test sample).

As shown in FIG. 3, the raw coal is transported from the pre-homogenizing piling fields to the raw coal silo and is conveyed to the microcomputerized dosing materials hopper by the belt conveyer and combined there with the AMC coming from the AMC silo after being dosed, then the blended coal mixture is sent by the conveyer to the ball intergrinding machine to be ground into powder and then separated by a coarse powder separator, wherein he coarse powder are fed back into the ball grinding machine for further grinding and the fine powder are sent to the cyclone separator for separation, the separated fine powder passing through 4,900 opening/cm2 sieve with the sieve residue being less than 15% are sent to the blended coal powder silo,

TABLE 2

| Item sequential order number | Before modification | | | | After modification | | | | Remarks |
|---|---|---|---|---|---|---|---|---|---|
| | inlet fly ash amount (kg/h) | outlet fly ash amount (kg/h) | dust removing efficiency (%) | fly ash emitting concentration mg/Nm³ | inlet fly ash amount (kg/h) | outlet fly ash amount (kg/h) | dust removing efficiency (%) | fly ash mitting concentration mg/Nm³ | |
| 1 | 7815.4 | 429.8 | 94.5 | 1395.0 | 15815.3 | 456.5 | 97.1 | 1530.4 | Dust removing efficiency |
| 2 | 9728.2 | 437.8 | 95.5 | 1513.4 | 11826.4 | 402.2 | 96.6 | 1288.3 | is raised by 1.9% |
| 3 | 11641 | 558.8 | 95.2 | 1931.7 | 13762.5 | 427.3 | 96.9 | 1369.7 | Emitting concentration is |
| average | 9728.2 | 475.5 | 95.1 | 1613.4 | 13801.4 | 428.7 | 96.9 | 1395.8 | lowered down by 13.49% |

Note:
based on the tracing test results of the environment monitoring center of Jilin provincial electric industry administration buro, tested on the boiler No. 2 of Jilin thermal power plant.

The notable reduction of discharged amounts of $SO_2$ and dust into the atmosphere is favourable for the atmospheric protection especially for acidic rain control. Thirdly, the environmental impairments from mining, land occupation and the pollution of cement works are eliminated.

The fourth prominent merit of the present invention is that it possesses other comprehensive benefits, for example, the transportation of most of raw materials and coal for cement production is saved, the intense transportation is released, the saved electrical power and coal can be used for other production categories or for people's daily life.

The present invention are further illustrated by following examples. It should be note that these examples are but used for the purpose of illustration, never shall they be understood as limitation to protection scope of the present invention as defined by claims in any sense. Any skilled person in the art can make variation or improvements on the present the fine blended coal mixture powder are conveyed to the blended coal powder feeder by the belt conveyer and then is blown by the primary blowing-in air into the furnacechamber of the apparatus for combustion, the high temperature and high pressure steam produced is sent to the steam power user such as electrical powder generation apparatus, while a main part of the fast-burnt cement clinker formed exits the furnace chamber along with the flue gas and is cooled down from about 1200° C. to below 200° C. in 1–5 seconds, then collected by the electrical dust remover; the remaining part of the fast-burnt cement clinker in form of furnace slag is quickly cooled down by quenching and also collected, the fast-burnt cement clinker including the furnace slag and the fly ash is sent to the cement clinker silo. The results of chemical analysis of the fast-burnt cement clinker obtained are listed in Table 3 (1-test sample). This fast-burnt cement clinker is mixed with 5% gypsum and then interground by the cement ball grinding machine and prepared into the fast-burnt cement. The test results of the performances of the obtained fast-burnt cement are listed in Table 4 (1# test sample).

EXAMPLE 2

All experimental conditions are same as those indicated in example 1, with the exception that the blended amount of the AMC is varied. The chemical analysis results of the fast-burnt cement clinker obtained (2-test sample) are listed in Table 3. 5% gypsum is added into said fast-burnt cement clinker and this mixture ground into cement (2# test sample) for performances test, the results are listed in Table 4

EXAMPLE 3

All experimental conditions are same as those of example 2, with the exception that the blended amount of the AMC is varied, the chemical analysis results of the fast-burnt cement clinker obtained (3-test sample) are listed in Table 3. 5% gypsum is added into said fast-burnt cement clinker and this mixture is ground into cement (2# test sample) for performances test, the results are listed in Table 4.

EXAMPLE 4

All experimental conditions are same as those of example 1, with the exception that the AMC further contains 0.3% fluorite, 2.0% crystal seed (525# portland cement clinker, in the following examples, the used crystal seeds are all this clinker), 1.2% barite (all based on the total weight of the cement clinker, and are same here below). A chemical composition analysis on the fast-burnt cement clinker (4-sample) obtained is listed in Table 3. 5% gypsum is added into the obtained clinker and the mixture interground into the fast burnt cement (4# test sample), and performances test is conducted thereon, the results are listed in Table 4.

EXAMPLE 5

All experimental conditions are same as those of example 2, with the exception that the AMC further contains 0.6% fluorite, 4.3% crystal seed, and 0.8% bante in addition to the lime. The chemical composition analysis on the cement clinker obtained (5-test sample) is listed in Table 3. 5% gypsum is added into the obtained clinker and the mixture is interground into cement (5# test sample) and; its performance test is carried thereon, the results are listed in Table 4.

EXAMPLE 6

All experimental conditions are same as those of example 3, with the exception that the AMC further contains 0.9% fluorite, 5.7% crystal seed, and 0.5% barite. A chemical composition analysis on the cement clinker (6#-test sample) is listed in Table 3. 5% gypsum is added into the obtained clinker and the mixture is interground into. cement (6# test sample). It's Performance test is conducted thereon, the results are listed in Table 4.

From the test results of sample 1#, 2#m, and 3# listed in Table 3 and 4, it can be seen that when an adequate amount of AMC containing only lime is blended into raw coal the fast-burnt cement clinker can actually be produced. Along with the increase of the CaO content in the cement clinker, the performances of the obtained fast-burnt cement clinker are also improved; in case their CaO contents are same but the AMC further contains certain amount of fluorite, crystal seed and early strong agent and loosener, the performances of the resulted fast-burnt cement clinkers are better than those of the clinker without addition of these additives, and this is much more the truth especially when the CaO content is high. We have found that the fast-burnt cement clinkers of examples 1 and 4 contain about 45% CaO only but the performances of the fast-burnt cements prepared therefrom reach 425# according to the national standard for ordinary portland cement. However, it is known that the CaO content of the ordinary portland cement clinker should be above 60% when a cement made therefrom reach a grade of 425#, this is because the "fast-burnt and fast cooled" technology of the present invention can endow the fast-burnt cement clinker with new physico-chemical features and hence with higher hydraulic cementitious activity.

EXAMPLE 7

Comparative Example 1

The present example involves the modification of coal ash by means of blending lime stone into coal powder according to the prior art process. The modification is carried out using the apparatus formed by reforming the existing coal-powder-burning boiler type Tn-230-2 made in USSR. The chemical composition of the coal ash substances is listed in Table 5 (10-test sample). The limestone blended thereinto is a commercial commodity, the CaO content of which is 52%. Referring to FIG. 4, the lime stone is sent to the ball grinding machine (15) to be preground into powder having its fineness of 4,900 opening/cm2, with the sieve residue less than 6%, then the powder is sent into the conveyer (3) after dosing to meet here with the raw coal conveyed from the raw coal prehomogenizing piling field (1), forming the blended coal mixture. Said blended coal mixture is again sent to he powder grinding machine (4) for further grinding; after the separation by the coarse powder separator (5) and the cyclone separator (6), the fine powder in a fineness of 4,900 opening/cm2 with the sieve residue less than 15% are collected and sent to the coal powder storage bin (7). The blended coal powder mixture is injected via the coal powder feeder (8) into the furnace chamber together with the primary blowing-in air for combustion at a furnace chamber temperature of 1300–1500° C. The high temperature and high pressure steam produced by the boiler is sent to steam power user such as electrical power generation installation (10), the coal ash emitting out from the furnace chamber is, after being quickly cooled down, collected by the electrical dust-remover. The results of the chemical analysis therefor are listed in Table 5 (11-test sample). This modified coal ash is sent, after being mixed with 5% gypsum, to the cement powder grinding machine for ball grinding and is prepared into cement, the results of its performances are listed in Table 6 (11# test sample).

Because the decomposition of $CaCO_3$ absorbs significant amount of thermal energy, its addition amount can not be large, or the normal combustion and steam power supply of the boiler will be negatively influenced or even fire-distinction accident will take place. It can be seen from Table 5 that the CaO content of this modified coal ash can reach only 16.52%, far away from the CaO content of common portland cement clinker which is normally above 60%. The cement prepared by adding 5% gypsum into this coal ash and then grinding in ball grinding machine has poor performances, failing to reach 275#, and this cement possesses not much use value.

EXAMPLE 8

Comparative Example 2

Figure 6:
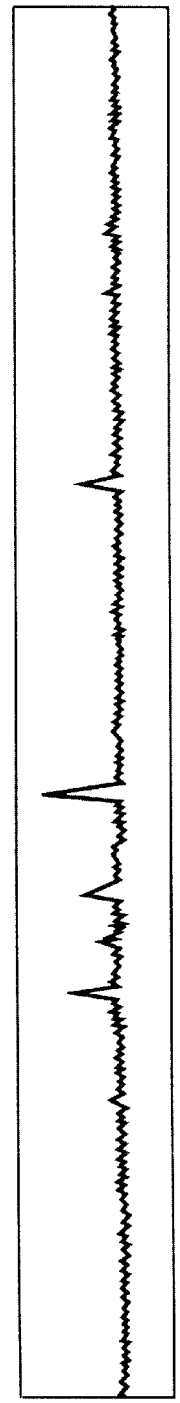
FIG. 6 is a XRD of the coal ash obtained after a modification according to a comparative example of the present invention by adding lime stone, mineralizing agent, crystal seed and early strong agent into coal.

All experimental conditions are same as those of example 7, with the exception that 0.43 fluorite, 5% crystal seed and 0.45% barite are blended into coal in addition to lime stone, the results of chemical analysis on the obtained coal ash are listed in Table 5 (12-test sample). The x-ray diffraction analysis on the powder sample (FIG. 6) shows that this coal ash only has very weak characterizing diffraction peaks of the silicate mineral phases, while has significant characterizing peak of $SiO_2$ and CaO. A polarizing microscopic physical phase analysis on this coal ash sample (FIG. 8) shows that there are but a small amount of crystallized particles which are presumably predicted as $SiO_2$ and CaO. The performances of the cement prepared using this coal ash and 5% gypsum are listed in Table 6 (12# test sample).

From the experimental data for samples 11# and 12# of Table 5 and 6, it can be seen that the hydraulic cementitious activity of the resulted coal ash, obtained by adding lime stone with or without addition of mineralizing agent (fluorite), crystal seed and early strong agent and loosener (barite), has not been significantly modified and the cement prepared using it as active substance fails to reach 275# and has not much use value.

EXAMPLE 9

Figure 7:
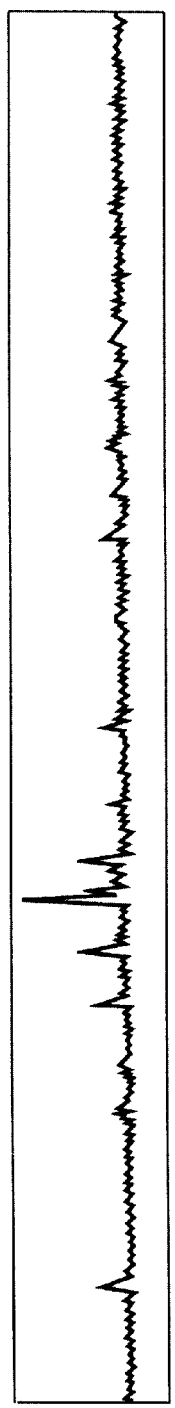
FIG. 7 is a XRD of the fast-burnt modified coal ash according to an embodiment of the present invention by adding the AMC containing only calcium-rich substance, substantially in form of CaO.

All experimental conditions are same as those in Example 7, with the exception that the AMC of the present inention, in replacement of lime stone, is blended into the coal. Said AMC contains only lime which is commercially available and the CaO content of which is about 92%. The experiment indicates that the blended coal mixture with the AMC containing but lime combusts very well and the furnace chamber is more bright than usual during its combustion. Thus the AMC can be added in much more amount. The chemical analysis results of the fast-burnt modified coal ash obtained are listed in Table 5 (13-test sample). A x-ray diffraction analysis on the sample (FIG. 7) shows that there exists notable characterizing peak of typical mineral phase of portland cement clinker such as $\beta$-$C_2S$ and crystallized tri-calcium silicate solid solution $54CaO.16SiO_2.Al_2O_3.MgO$, a cement is prepared by adding 5% gypsum into this fast-burnt modified coal ash and grinding them into fine powder, the performances of this cement are listed in Table 6 (13-1# test sample). When further 10% portland cement clinker at grade of 525# is added there into and ground into fine powder, the cement (13-2# test sample) performances are listed in Table 6. It can be seen from Table 5 and 6 that when AMC is used to replace $CaCO_3$, the CaO content of the fast-burnt modified coal ash can be remarkably enhanced, reaching 44.36% in this case, the hydraulic cementitious activity of the modified coal ash is also sinificantly raised. The cement prepared using it as the sole cementitious active component has a strength grade (13-1# test sample) reaching 425#. After having been added with 10% of conventional clinker, the cement obtained (13-2# test sample) is graded above 425#.

EXAMPLE 10

The experiment is carried out same as Example 9, with the exception that the amount of the blended AMC is varied. The chemical analysis results of the obtained fast-burnt modified coal ash (14-test sample) are listed in Table 5. The performances: of the cement (14# test sample) prepared by adding 5% gypsum into this fast-burnt modified coal ash are listed in Table 6.

EXAMPLE 11

The experiment is carried out same as Example 9 with the exception that the amount of the blended AMC is varied. The chemical analysis results of the obtained fast burnt modified coal ash (15-test sample) are listed in Table 5. The performances of the cement (15# test sample) prepared by adding 5% gypsum into the fast-burnt modified coal ash are in Table 6.

EXAMPLE 12

The experiment is conducted same as Example 10 with the exception that the blended AMC contains further 0.3% mineralizing agent (fluorite), 2.0% crystal seed, 1.2% early strong agent and loosener (barite) in addition to lime. The chemical analysis results of the fast-burnt modified coal ash obtained are listed in Table 5 (16-test sample). The performances of the cement (16# test sample) prepared by adding 5% gypsum into this fast-burnt modified coal ash and then having them being finely ground are listed in Table 6. It can be seen that the CaO content in the fast-burnt modified coal ash reaches 33.12% and the cement product produced in this way has its strength grade above 325#.

EXAMPLE 13

The experiment is conducted same as Example 9 with exception that the blended AMC is varied and further contains 0.6% fluorite, 4.3% crystal seed and 0.8% barite. The chemical analysis on the fast-burnt modified coal ash obtained is listed in Table 5 (17-test sample). The performances of the cement (17 # test sample) prepared by adding 5% gypsum into this fast-burnt modified coal ash and then having them being finely ground are listed in Table 6. It can be seen that the performances of the cement can match that of the portland coal ash cement at a grade of 525#.

EXAMPLE 14

The experiment is conducted same as Example 11 with the exception that the blended AMC further contains 0.9% fluorite, 5.7% crystal seed and 0.5% barite. The chemical analysis on the fast-burnt modified coal ash obtained is illustrated in. Table 5 (18-test sample). The performances of the cement (11# test sample) prepared by adding 5% gypsum into this fast-burnt modified coal ash and then having them finely ground are listed in Table 6. It can be seen that the performances of the cement can match that of portland coal ash cement at a grade of 525#.

EXAMPLE 15

The present example relates to the experiment on the desulfurizing effect of AMC for the exhaust from coal powder burning boiler. The experiment is conducted under the same conditions of Example 9, with the exception that the lime addition amount is changed, the fast-burnt modified coal ash obtained has a CaO content of 23.7% (by weight), as is shown in Table 7. The average result of two tests show, that the emitted amount of $SO_2$ in the flue gas is lowered at a rate of 38.9%.

Another experiment has been conducted under the conditions of Example 12, due to AMC addition, the emitted amount of $SO_2$ in the flue gas is lowered at a rate of 46.8%. These results show that the desulfurizing process of the present invention possesses significant desulfuizing effect from the flue gas of the coal powder burning boiler.

TABLE 3

| Test Sample | SiO$_2$ (%) | Al$_2$O$_3$ (%) | FeO$_3$ (%) | CaO (%) | MgO (%) | Loss on ignition (%) | Others (%) | Total |
|---|---|---|---|---|---|---|---|---|
| 0 | 63.2 | 18.0 | 8.3 | 1.5 | 1.6 | 4.9 | 2.5 | 100 |
| 1 | 34.6 | 9.85 | 4.54 | 46.07 | 0.88 | 2.68 | 1.38 | 100 |
| 2 | 44.93 | 12.85 | 5.94 | 30.13 | 1.14 | 2.97 | 2.04 | 100 |
| 3 | 23.20 | 6.57 | 3.03 | 63.50 | 0.54 | 2.21 | 0.95 | 100 |
| 4 | 34.80 | 9.92 | 4.57 | 45.83 | 0.88 | 2.50 | 1.48 | 100 |
| 5 | 43.34 | 12.28 | 5.61 | 32.71 | 1.09 | 2.82 | 2.15 | 100 |
| 6 | 23.51 | 6.67 | 3.09 | 63.12 | 0.60 | 1.82 | 1.19 | 100 |

TABLE 4

| Test Sample | Initial setting (hr. min) | Final setting (hr. min) | Soundness | Antibending Strength (MPa) 3 days | 7 days | 28 days | Compressive strength (MPa) 3 days | 7 days | 28 days | Strength grade* |
|---|---|---|---|---|---|---|---|---|---|---|
| 1# | 2:12 | 3:20 | qualified | 4.1 | 5.0 | 7.0 | 22.3 | 29.4 | 44.2 | 425 |
| 2# | 3:35 | 4:41 | qualified | 2.7 | 3.6 | 6.1 | 13.4 | 17.3 | 35.4 | 325 |
| 3# | 1:53 | 2:49 | qualified | 5.1 | 6.0 | 7.6 | 25.4 | 36.7 | 53.4 | 525 |
| 4# | 2:20 | 3:41 | qualified | 4.2 | 5.3 | 7.2 | 23.4 | 31.2 | 46.9 | 425 |
| 5# | 3:19 | 4:32 | qualified | 2.9 | 3.8 | 6.4 | 13.7 | 19.6 | 37.1 | 325 |
| 6# | 1:30 | 2:41 | qualified | 5.3 | 6.5 | 7.8 | 27.6 | 38.1 | 54.5 | 525 |

TABLE 5

| Test Sample | SiO$_2$ (%) | Al$_2$O$_3$ (%) | FeO$_3$ (%) | CaO (%) | MgO (%) | Loss on ignition (%) | Others (%) | Total |
|---|---|---|---|---|---|---|---|---|
| 10 | 68.32 | 20.65 | 2.51 | 1.20 | 2.96 | 2.80 | 1.56 | 100 |
| 11 | 57.43 | 17.20 | 2.01 | 16.52 | 2.50 | 3.02 | 1.32 | 100 |
| 12 | 54.94 | 16.50 | 1.95 | 20.12 | 2.01 | 3.22 | 1.26 | 100 |
| 13 | 38.27 | 11.56 | 1.41 | 44.36 | 1.64 | 1.58 | 1.18 | 100 |
| 14 | 46.63 | 14.07 | 1.75 | 32.56 | 2.02 | 1.91 | 1.06 | 100 |
| 15 | 26.73 | 8.01 | 0.91 | 60.92 | 1.17 | 1.11 | 1.15 | 100 |
| 16 | 46.02 | 13.89 | 1.72 | 33.12 | 2.00 | 1.89 | 1.36 | 100 |
| 17 | 32.54 | 9.73 | 1.13 | 52.51 | 1.43 | 1.35 | 1.31 | 100 |
| 18 | 26.25 | 7.97 | 1.00 | 61.40 | 1.16 | 1.09 | 1.13 | 100 |

TABLE 6

| Test Sample | Initial setting (hr. min) | Final setting (hr. min) | Soundness | Antibending Strength (MPa) 3 days | 7 days | 28 days | Compressive strength (MPa) 3 days | 7 days | 28 days | Strength grade* |
|---|---|---|---|---|---|---|---|---|---|---|
| 11# | 7:44 | 9:50 | qualified | — | 2.0 | 4.5 | — | 6.7 | 16.5 | −275 |
| 12# | 5:58 | 7:23 | qualified | — | 2.1 | 4.7 | — | 8.00 | 20.3 | −275 |
| 13-1# | 4:55 | 5:55 | qualified | 3.0 | 4.5 | 7.0 | 14.4 | 21.4 | 40.6 | 425 |
| 13-2# | 1:48 | 2:58 | qualified | 3.8 | 4.9 | 7.3 | 17.6 | 25.0 | 44.8 | +425 |
| 14# | 3:47 | 4:53 | qualified | 2.5 | 3.5 | 6.1 | 13.2 | 17.2 | 37.3 | +325 |
| 15# | 3:07 | 4:12 | qualified | 4.3 | 5.5 | 7.5 | 19.3 | 29.2 | 46.6 | +425 |
| 16# | 3:30 | 4:45 | qualified | 3.1 | 3.8 | 6.3 | 15.3 | 19.4 | 39.8 | +325 |
| 17# | 2:38 | 3:53 | qualified | 4.6 | 5.6 | 7.0 | 22.2 | 33.0 | 52.9 | 525 |
| 18# | 2:15 | 3:41 | qualified | 4.9 | 5.8 | 7.4 | 22.7 | 34.0 | 53.2 | +525 |

*tested according to portland coal ash cement standard.
− denotes below the grade number; + denotes above the grade number.

TABLE 7

| Before blending the AMC | | | | After blending the AMC | | | | The reduction rate of |
|---|---|---|---|---|---|---|---|---|
| CaO content in the coal ash (wt %) | standardized wet flue gas amount Nm$^3$/hr | SO$_2$ emitting concentration mg/Nm$^3$ | SO$_2$ emitting amount kg/h | CaO content in the coal ash (wt %) | standardized wet flue gas amount Nm$^3$/hr | SO$_2$ emitting concentration mg/hr | SO$_2$ emitting amount kg/hr | the SO$_2$ emitting amount after blending the AMC |
| 1.2 | 322974.5 | 217.8 | 70.4 | 23.7 | 317067.7 | 155.8 | 49.4 | |
| | 322964.3 | 229.7 | 74.2 | | 310789.1 | 125.6 | 39.0 | |
| average value | 322969.4 | 223.7 | 72.3 | | 313928.4 | 140.7 | 44.2 | 38.9 |

TABLE 7-continued

| Before blending the AMC | | | | After blending the AMC | | | | The reduction rate of |
|---|---|---|---|---|---|---|---|---|
| CaO content in the coal ash (wt %) | standardized wet flue gas amount Nm³/hr | SO₂ emitting concentration mg/Nm³ | SO₂ emitting amount kg/h | CaO content in the coal ash (wt %) | standardized wet flue gas amount Nm³/hr | SO₂ emitting concentration mg/hr | SO₂ emitting amount kg/hr | the SO₂ emitting amount after blending the AMC |
| 1.2 | 322974.5 | 217.8 | 70.4 | 33.1 | 313947.4 | 135.9 | 42.66 | |
|  | 322964.3 | 229.7 | 74.2 |  | 307730.9 | 111.5 | 34.31 | |
| average value | 322969.4 | 223.7 | 72.3 |  | 310839.3 | 123.7 | 38.49 | 46.8 |

What is claimed is:

1. A process for simultaneously producing steam power and fast-burnt cement clinker in a single coal powder-burning boiler system in which steam having a high temperature and high pressure is produced for delivery to a steam power user comprising blending raw coal with AMC to form an admixture, said AMC comprising a calcium-rich substance in the form of CaO; homogeneously mixing the blended coal mixture, grinding the homogeneously mixed coal mixture into a powder having a fineness of 4,900 opening/cm² with a sieve residue of less than 30%, injecting the powder thus obtained into a furnace chamber and burning the powder at a high temperature above 1300° C. to produce high pressure steam from the apparatus and effect reaction between the AMC and coal ash produced by the combustion to form fast-burnt cement clinker, wherein the amount of AMC blended with the raw coal pro ides a fast-burnt cement clinker having a Ca content expressed at CaO % by weight in the range from 30–65% based on the total weight of the fast-burnt cement clinker.

2. The process of claim 1 wherein the AMC further contains a mineralizing agent, crystal seed, strengthening agent or loosener.

3. The process according to claim 1, wherein the fast-burnt cement clinker is rapidly cooled from 1200° C. to 200° C. in 1–5 seconds after its exiting from the furnace chamber.

4. The process according to claim 1, wherein the Ca content expressed as CaO % by weight is in the range of 45–65% based on the total weight of the fast-burnt cement clinker.

5. The process according to claim 1, wherein the said calcium-rich substance is lime.

6. The process according to claim 1, wherein the amount of AMC blended with the raw coal provides a fast-burnt cement clinker further having a mineralizing agent content in the range of up to 2% by weight, a crystal seed content in the range of up to 7% by weight and an early strengthening agent and loosener in the range of up to 2% by weight, based on the total weight of the fast burnt cement clinker.

7. The process according to claim 6, wherein the mineralizing agent is fluorite.

8. The process according to claim 6, wherein the crystal seed is conventional Portland cement clinker in form of fine crystal grain.

9. The process according to claim 6, wherein the early strengthening agent and loosener is barite.

10. The process according to claim 1, wherein the powder has a fineness of 4,900 opening/cm² with the sieve residue of less than 15%.

11. The process according to claim 1, wherein the powder has a fineness of 4,900 opening/cm² with the sieve residue of less than 6%.

12. The process according to claim 1, wherein the temperature in the high temperature zone of the furnace chamber is in range of 1350–1700° C.

13. The process according to claim 1, wherein the temperature in the high temperature zone of the furnace chamber is in range of 1450–1550° C.

14. The process according to claim 1, wherein the residence time of the powder of the blended coal admixture in the high temperature zone of the furnace chamber is not less than 2 seconds.

15. The process according to claim 14, wherein the residence time is not less than 4 seconds.

16. The process according to claim 14, wherein the residence time is not less than 6 seconds.

17. The process according to claim 1, wherein the furnace of said coal powder-burning boiler system is a coal powder burning furnace or cyclone furnace.

18. The process according to claim 1, wherein said steam power user includes a thermal electrical power generation plant.

19. A fast-burnt cement clinker obtained according to the process of claim 1.

20. A fast-burnt cement clinker obtained according to the process of claim 6.

21. A fast-burnt cement prepared by grinding cementitious active substance consisting of the fast-burnt cement clinker of claim 19 together with a conventional cement auxiliary substance.

22. A fast-burnt cement, prepared by mixing the cement clinker of claim 19 as a cementitious active substance in an amount of 65–90% by weight with a conventional Portland cement clinker in an amount of 5–30% by weight and conventional cement auxiliaries in an amount of about 5% by weight, based on the total weight of the cement, and then grinding the mixture into powder.

23. A process for simultaneously producing steam power and fast-burnt modified coal ash in a single existing coal powder-burning boiler system in which steam having high temperature and high pressure is produced for delivery to a steam power user, comprising blending raw coal with AMC to form an admixture, said AMC comprising a calcium-rich substance in the form of CaO; homogeneously mixing the blended coal mixture, grinding the homogeneously mixed coal mixture into a powder having a fineness of 4,900 opening/cm² with a sieve residue of less than 30%, injecting the powder thus obtained into a furnace chamber and burning the powder at a high temperature above 1300° C. to produce high pressure steam from the boiler system and effect reaction between the AMC and coal ash produced by the combustion to form fast-burnt modified coal ash, wherein the amount of AMC blended with the raw coal provides a fast-burnt modified coal ash having a Ca content expressed as CaO % by weight in the range from 30–65% based on the total weight of the fast-burnt modified coal ash.

24. The process according to claim 23, wherein the fast-burnt modified coal ash is rapidly cooled from 1200° C. to below 200° C. in 1–5 seconds after its exiting from the furnace chamber.

25. The process according to claim 23, wherein the Ca content expressed as CaO % by weight is in range from 45–65% based on the total weight of the fast-burnt modified coal ash.

26. The process according to claim 23, wherein the said calcium-rich substance is lime.

27. A process according to claim 23, wherein the amount of, AMC blended with the raw coal provides a fast burnt modified coal ash further having a mineralizing agent content in the range of up to 2% by weight, a crystal seed content in the range of up to 7% by weight and an early strengthening agent and loosener content in the range of up to 2% by weight, based on the total weight of the fast brunt modified coal ash.

28. The process according to claim 23, wherein the mineralizing agent is fluorite.

29. The process according to claim 27 wherein the crystal seed is conventional Portland cement clinker in the form of fine crystal grain.

30. The process according to claim 27 wherein the early strengthening agent and loosener is barite.

31. The process according to claim 23, wherein the powder has a fineness of 4,900 opening/cm$^2$ with a sieve residue of less than 15%.

32. The process according to claim 23, wherein the powder has a fineness of 4,900 opening/cm$^2$ with a sieve residue' of less than 6%.

33. The process according to claim 23, wherein the temperature in the high temperature zone of the furnace chamber is in range from 1350–1700° C.

34. The process according to claim 23, wherein the temperature in the high temperature zone of the furnace chamber is in range from 1450–1550° C.

35. The process according to claim 23, wherein the residence time of the powder of the blended coal admixture in the high temperature zone of the furnace chamber is not less than 2 seconds.

36. The process according to claim 35, wherein the residence time of the powder in the high temperature zone of the furnace chamber is not less than 4 seconds.

37. The process according to claim 36, wherein the residence time of the powder in the high temperature zone of the furnace chamber is not less than 6 seconds.

38. The process according to claim 23, wherein the said furnace in coal powderburning boiler system is a coal powder-burning furnace or a cyclone furnace.

39. The process according to claim 23, wherein the said steam power user includes thermal electrical powder generation plant.

40. A fast-burnt modified coal ash, obtained according to the process of claim 23.

41. A fast-burnt modified coal ash, obtained according to the process of claim 27.

42. A fast-burnt modified coal ash cement, prepared by grinding cementitious active substance consisting of the fast-burnt modified coal ash of claim 40 together with a conventional cement auxiliary substance.

43. A fast-burnt modified coal ash cement, prepared by mixing the fast-burnt modified coal ash of claim 40 as a cementitious active substance with its blending amount in range of 65–90% by weight, and mixing it with a small amount of conventional Portland cement clinker in an amount of 5–30% by weight and about 5% conventional Cement auxiliary in an amount of about 5%, by weight, and then grinding the mixture into powder.

44. A process for reducing sulfur content in the flue gas of the coal powder burning boiler system, in which steam having high temperature and high pressure is produced for delivery to a steam power user, comprising blending raw coal containing sulfur with AMC to form an admixture, said AMC comprising a calcium-rich substance substantially in the form of CaO homogeneously mixing the blended coal mixture, grinding the coal mixture into a powder having a fineness of 4,900 opening/cm$^2$ with a sieve residue of less than 30%, injecting the powder thus obtained into a furnace chamber and burning the powder at a high temperature above 1300' C. to produce high pressure steam from the boiler system and effect reaction between the AMC and coal ash substances produced by the combustion whereby sulfur contained in the raw coal is combined into the coal ash substance and converted into a harmless form, wherein the amount of AMC blended with the raw coal provides a coal ash having a Ca content expressed as CaO% by weight in the range from 30–65% based on the total weight of the coal ash.

45. A process according to claim 44, wherein the calcium-rich substance is lime.

46. A process according to claim 44, wherein the amount of AMC blended with the raw coal provides a coal ash further having a mineralizing agent content in the range of up to 2% by weight, a crystal seed content in the range of up to 7% by weight and an early strengthening agent and loosener in the range of up to 2% by weight, based on the total weight of the coal ash.

47. The process according to claim 46 wherein the mineralizing agent is fluorite.

48. The process according to claim 46 wherein the crystal seed is conventional Portland cement clinker in the form of fine crystal grain.

49. The process according to claim 46, wherein the early strengthening agent and loosener is barite.

50. The process according to claim 44 wherein the fineness of the ground coal mixture powder is 4,900 opening/cm$^2$ with the sieve residue of less than 15%.

51. The process according to claim 44 wherein the fineness of the ground coal mixture powder is 4,900 opening/cm2 with the sieve residue of less than 6%.

* * * * *